Nov. 1, 1927.

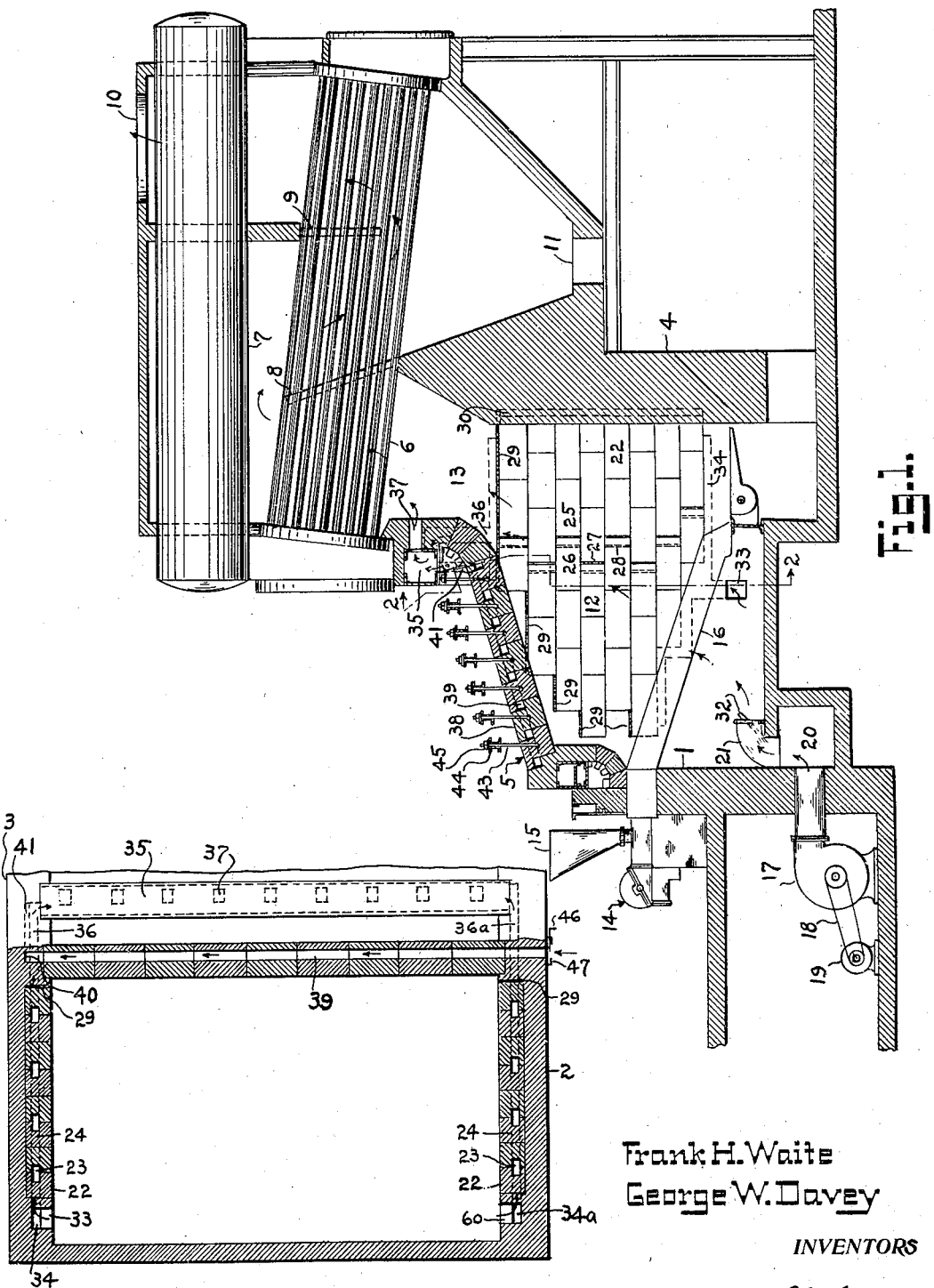

F. H. WAITE ET AL 1,647,488

FURNACE CONSTRUCTION

Filed Oct. 15, 1925

Frank H. Waite
George W. Davey
INVENTORS

BY Charles A. Clark

ATTORNEY

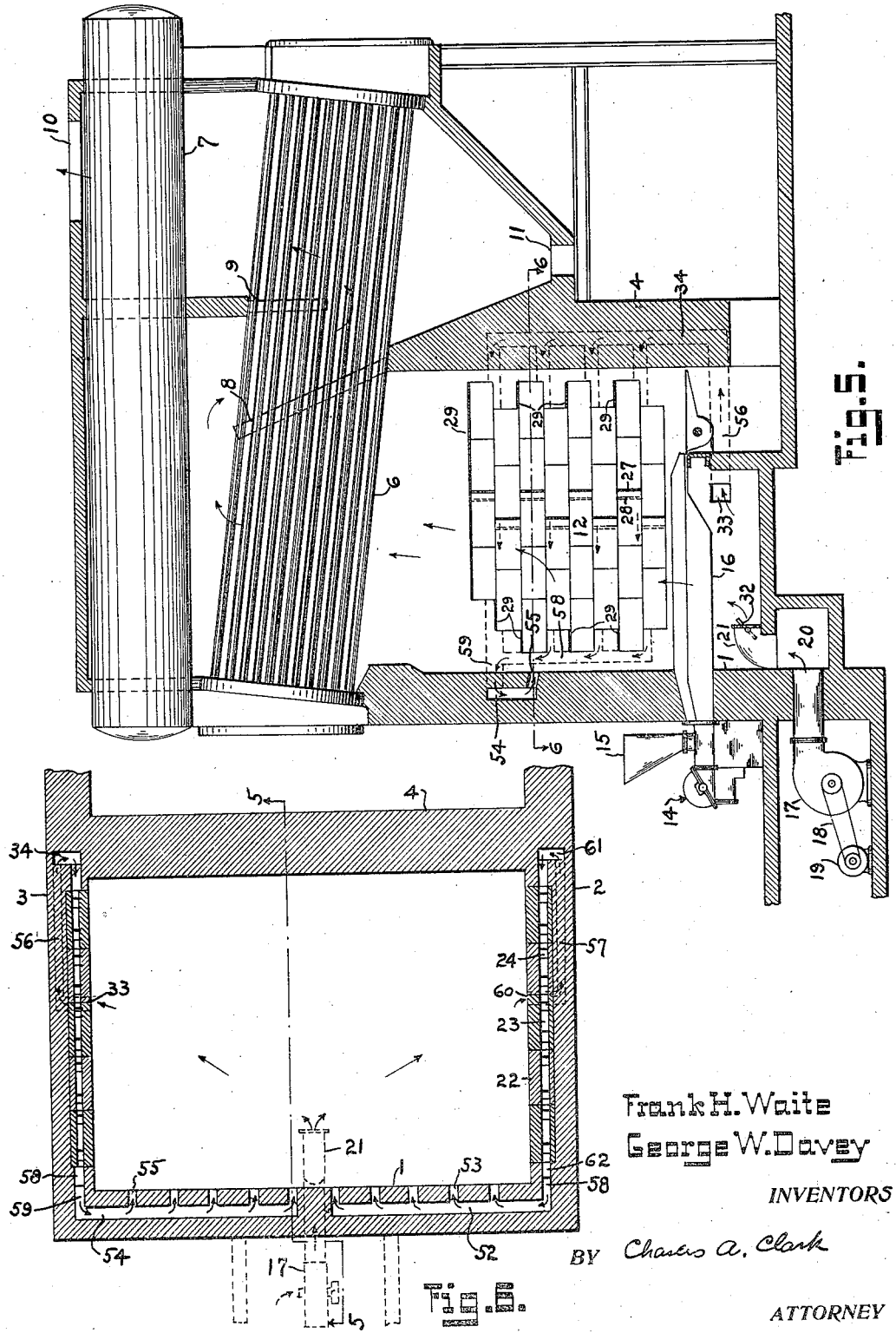

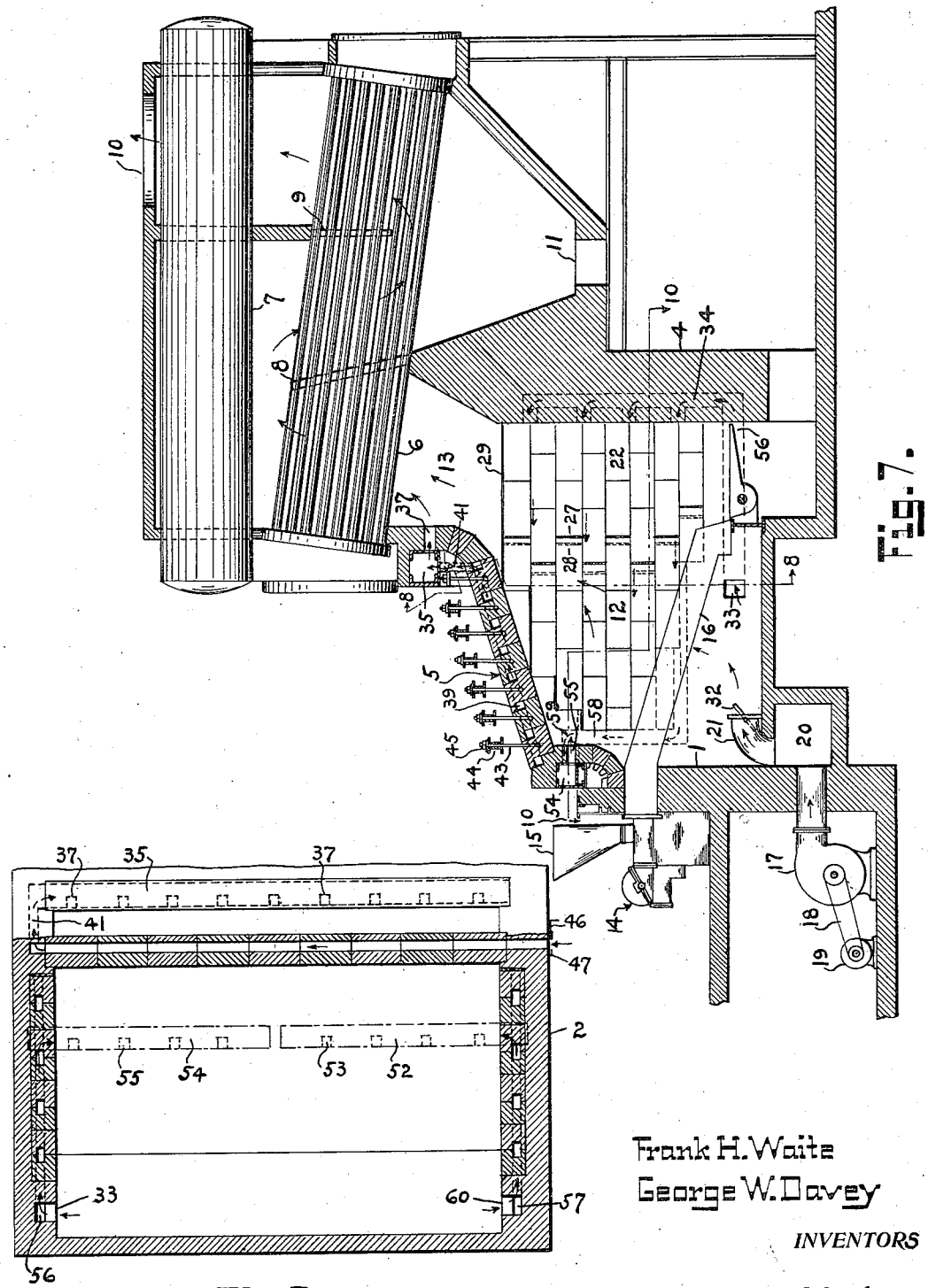

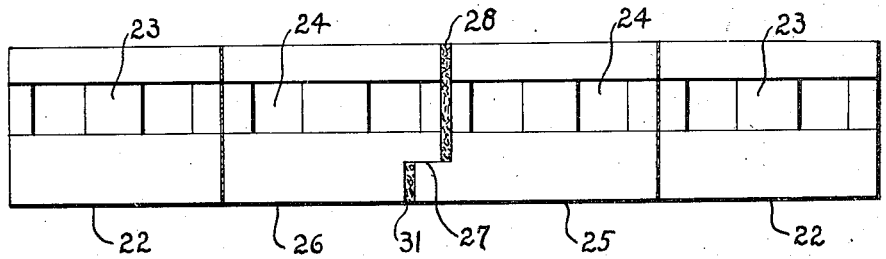
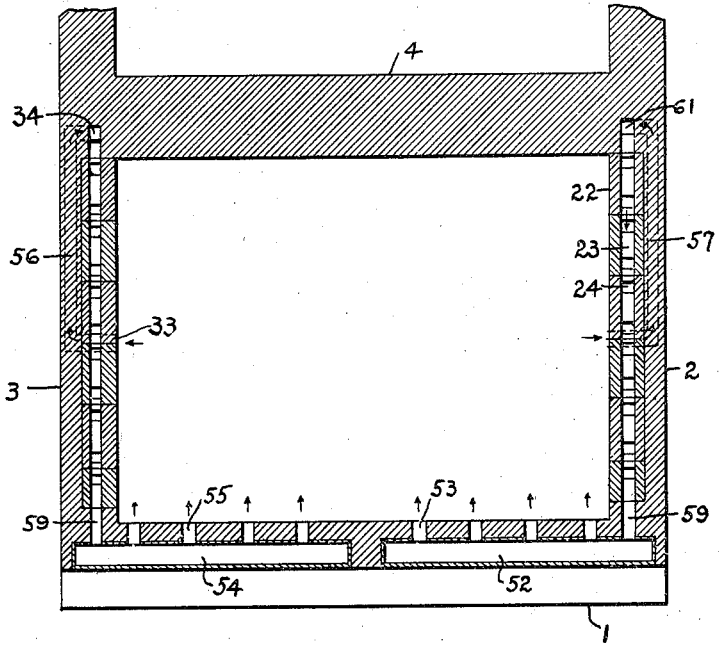
Frank H. Waite
George W. Davey
INVENTORS
BY Charles A. Clark
ATTORNEY Patented Nov. 1, 1927.

1,647,488

UNITED STATES PATENT OFFICE.

FRANK H. WAITE AND GEORGE W. DAVEY, OF LONG ISLAND CITY, NEW YORK.

FURNACE CONSTRUCTION.

Application filed October 15, 1925. Serial No. 62,630.

Our invention relates to furnace construction and the method of circulating air in furnace walls wherein air is circulated throughout the walls, preheated in transit and is directed either into the combustion chamber or throat of the furnace or both.

This is accomplished by utilizing the heat transfer function of our air cooled furnace blocks specifically illustrated, described and claimed in our application bearing Serial Number 55,752, filed September 11th, 1925.

Our invention not only contemplates the furnace construction but also the combinations of air circulations by forced draft from a blower or fan or the like and more specifically relates to the utilizing of preheated air thus obtained for a more perfect combustion of the fuel in the furnace and is particularly useful in connection with water tube boiler stoker furnaces.

One object of our invention is to circulate air within furnace walls in such a manner that the air is forced under pressure of a blower or fan throughout the walls of a furnace, flows in the same direction or at right angles to the flaming gases within the combustion chamber and the preheated air is utilized for a more complete combustion of the fuel.

Another object of our invention is to circulate air within furnace walls under pressure of a blower or fan as aforesaid and to circulate air by natural or stack draft in the arch, utilizing the preheated air in both circulations for a more complete combustion of the fuel.

Other valuable features of our invention are described, pointed out and illustrated in the accompanying drawings wherein like numerals refer to like parts, in which:—

Figure 1 is a longitudinal section of a water tube boiler stocker furnace with a suspended air cooled arch.

Figure 2 is a plan in section of a part of Figure 1.

Figure 5 is a longitudinal section of a water tube boiler stoker furnace, illustrating another modification.

Figure 6 is a partial plan in section of Figure 5.

Figure 7 is a longitudinal section of a water tube boiler stoker furnace with a suspended arch, illustrating still another modification of the invention.

Figure 8 is a partial elevation in section of Figure 7.

Figure 9 is a plan view illustrating an expansion block employed.

Figure 10 is a partial plan view in section of Figure 7.

Figures 3, 4:
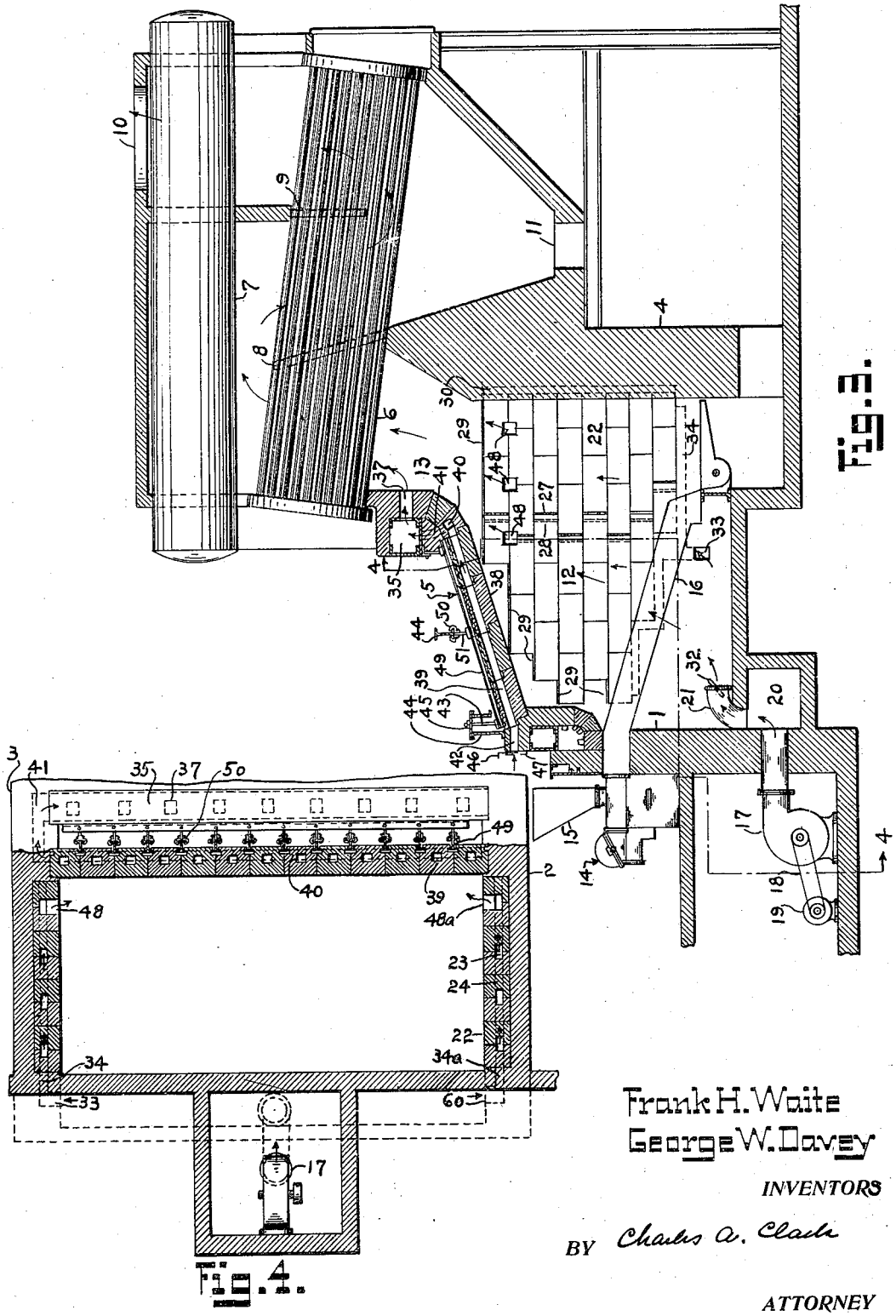
Figure 3 is a longitudinal section of a water tube boiler stoker furnace with a suspended arch, illustrating a modification of the invention.
Figure 4 is a partial plan in section of Figure 3.

Figures 1 and 2 illustrate a water tube boiler stoker furnace comprising a front wall 1, side walls 2 and 3, bridge wall 4, arch 5, water tubes 6, drum 7, diagonal baffle 8, vertical baffle 9, gas outlet 10, clean out opening 11, combustion chamber 12, throat 13, stoker 14, coal hopper 15, stoker grate 16, and a blower or fan 17 driven by the motor 19 and belt 18.

There are two separate and distinct circulations of air in the walls and arch as well as the well known forced draft circulation throughout the furnace from blower to stack, illustrated in Figures 1 and 2, one of which circulates under pressure throughout the side walls 2 and 3 having for its specific purpose the object of cooling the blocks and directing the air preheated in transit throughout the said blocks into a common manifold, together with the other circulation which passes throughout the suspended blocks of the arch by natural draft into said manifold, both circulations being delivered into the throat of the furnace to complete the combustion of the fuel therein.

The side walls 2 and 3 are built up of a series of superimposed, horizontal courses of air cooled blocks 22, having horizontal passages 23 and vertical passages 24 therein, and said wall being provided with the horizontal expansion space 30 and also expansion blocks 25 and 26, illustrated in Figure 9, integral with the wall built up of unit blocks 22, the expansion blocks 25 and 26, having expansion spaces 27 and 28 preferably filled with asbestos or the like upon its construction or some fireproof compressible or some incombustible material.

To provide for the vertical expansion the wall has expansion spaces 29 preferably filled with some combustible material during the process of building or a compressible incombustible material equal or equivalent to asbestos.

The expansion blocks 25 and 26 are slidable at 31 in gas-tight unity with each other and are built up in a wall together with unit blocks 22 hereinbefore mentioned, all of which having the functions illustrated, described and claimed in our pending applications filed September 11th, 1925, bearing Serial Number 55,752 and October 8th, 1925, Serial Number 61,237.

The air in the well known forced draft, blower or pressure circulations comes from the blower 17, passes into the wind box 20 or the like, upwardly through the elbow or conduit 21 with its controlling damper 32, upwardly under the grate 16 of the stoker 14 and part of said air passes through the fuel bed into the combustion chamber 12, throat 13, upwardly around the water tubes 6, over the angular baffle 8, under and around the drum 7, downwardly under the vertical baffle 9 around the water tubes 6, upwardly around said tubes 6 around the drum 7, out the gas outlet 10 to the stack or the like.

The air cooling the side walls is forced by the blower 17 into a wind box or an equivalent 20, through a conduit, pipe elbow or the like 21 which is provided with a controlling damper 32, through a flue, duct or the like 33 and 60 communicating with a common duct 34 and 34ª, one on each wall 2 and 3, integral with the wall of superimposed blocks 22, 25 and 26, shown in Figure 1, said duct 34 communicating with the vertical and horizontal passages 23 and 24 within the blocks 22, 25 and 26, passes upwardly, parallel to the flow of flaming gases within the combustion chamber of the furnace, throughout each wall 2 and 3 into the common manifold 35 through a duct or equivalent 36 and 36ª, one for each side wall, through a multiplicity of flues, ducts or the like 37 into the throat of the furnace, where the air preheated in transit throughout the walls is utilized for a more perfect combustion of the products of combustion therein.

The other circulation by natural draft entering the flues 39 of the arch through a series of openings, ducts or the like 42, said arch being composed of a series of unit blocks 38, formed or moulded to provide upon the completion of the arch the series of flues or ducts 39 throughout and integral with the arch 5, said flues directing the air to pass throughout the arch in a direction at right angles to the flow of flaming gases within the combustion chamber 12, into a common manifold 40 from whence the air preheated in transit throughout the arch 5 is directed into the common manifold 35 by the flue or duct 41 where it mingles with the preheated air from the walls as hereinbefore mentioned, to finally pass through the multiplicity of ducts 37 into the throat 13 of the furnace for a more perfect combustion of the products of combustion therein.

The unit blocks 38 of the arch 5 are suspended by the supports, bolts, hooks or suitable means 43 connected to the beams 44 and held by the nuts or other suitable means 45.

The air circulation by forced draft through the walls 2 and 3 is controlled by the damper 32, while the air circulating by natural or stack draft throughout the arch is controlled by the slide 46 of the damper 47 as illustrated in Figure 2.

Figures 3 and 4 illustrate a furnace construction and method of circulating four different and separate circulations of air therein.

The first circulation is typical throughout the specification and drawings and comprises the well known forced draft circulation from the blower or fan 17 wherein the air is forced into the wind box 20 through a duct, elbow or pipe 21 provided with a controlling damper 32, under the grate 16 of the stoker 14, throughout the fuel bed on the said grate into the combustion chamber 12, upwardly through the throat 15, around the water tubes 16, under and around the drum 7 over the angular baffle 8, downwardly around the water tubes 6, under the vertical baffle 9, upwardly around said tubes 6, around the drum 7 and through the gas outlet 10 to the stack.

The second and third forced draft circulations are in side walls 2 and 3, respectively, wherein some of the air from the blower or fan 17, forced into the wind box 20 passing through the pipe or the like 21 with the controlling damper 32 under the grate 16 of the stoker 14, passes upwardly through the duct or flues 33 and 60 into a common manifold 34 and 34ª from whence it passes upwardly throughout the wall built up of superimposed, broken jointed unit air cooled refractory blocks 22, 25 and 26, within the horizontal and vertical passages, flues or the like 23 and 24, integral with said blocks 22, 25 and 26, through the ducts, flues or openings 48 and 48ª into the combustion chamber 12 at a point adjacent to the throat 13 on a plane parallel, below or near to the combustion arch of the furnace, whereby the air preheated in transit directed upwardly parallel to the flow of flaming gases within the combustion chamber throughout the said blocks is utilized for a more complete combustion of the products of combustion within the furnace.

The fourth circulation is a natural or stack draft circulation wherein the air passes into the flues or ducts 39 formed upon the completion of the arch 5, through the ducts, flue or opening 42 provided with controlling damper 47 with the slide 46, flows in an upward direction substantially parallel to the flow of flaming gases within the combustion chamber 12, into a common manifold 40, passes through a flue or duct 41 into a common manifold 45 from whence it enters the throat 13 of the furnace through a multiplicity of flues or ducts 37.

This arch is composed of a series of unit blocks 38 detachably held in suspension by suitable means, one of which is illustrated in Figures 3 and 4 wherein the blocks 38, with their flues 39 therein are suspended by the I beam 49, clamps 50, rods 51, rods 43, beams 44 and nuts 45, or any suitable equivalent.

The side walls 2 and 3 are provided with means to compensate for the horizontal expansion of the walls, which means is similar to that utilized in Figures 1 and 3 as illustrated in Figure 9 in conjunction with the expansion space 30; and the vertical expansion is compensated for by the expansion space 29 as clearly shown in Figure 3.

Figures 5 and 6 illustrate a water tube boiler stoker furnace wherein there are three separate and distinct circulations utilized.

The first circulation comprises the well known forced draft circulation as hereinbefore mentioned.

The second circulation is in the side wall 3, wherein part of the air from the fan or blower 17, passing into the wind box 20 through the elbow 21 with the controlling damper 32 under the stoker grate 16 enters the flue or duct 33 and 56, passes into the common manifold 34 from whence it flows in a substantially horizontal direction, at right angles to the flow of flaming gases within the combustion chamber 12, throughout the air cooled blocks 22, 25 and 26, which makes up a portion of the wall 3, into a common manifold 58 which is connected to another manifold 54, located in wall 1 by a flue or duct 59, said manifold 54 being provided with a multiplicity of flues or ducts 55 communicating with the interior of the furnace into the combustion chamber 12.

The third circulation is similar to the second aforesaid only in the opposite wall 2 wherein the air from the blower or fan 17 enters the wind box 20, the elbow 21 with the controlling damper 32, under the grate 16 of the stoker 14 and part of which is forced by pressure into the ducts or flues 60 and 57, passes into the common manifold 61 throughout the air cooled refractory blocks 22, 25 and 26 into the common manifold 62 from whence it passes into the manifold 52 through the flue or duct 58 which manifold 52 is provided with a multiplicity of flues or ducts 53, communicating with the combustion chamber 12 of the furnace.

The walls are provided with special expansion blocks 25 and 26 hereinbefore mentioned and described and vertical expansion means 29.

Figures 7 and 8 illustrate a water tube boiler stoker furnace having an arch wherein there are four separate and distinct circulations part of the preheated air being directed under the combustion arch 5 and part into the throat of the furnace.

The first circulation comprises the well known forced draft circulation as hereinbefore mentioned.

The second circulation is in the side wall 3, wherein part of the air from the fan or blower 17 passing into the wind box 20 through the elbow 21 with the controlling damper 32 under the stoker grate 16, enters the flue or duct 33 and 56, passes into the common mainfold 34 from whence it flows in a substantially longitudinal direction at right angles to the flow of flaming gases within the combustion chamber 12, throughout the air cooled blocks 22, 25 and 26 which make up a portion of the wall 3, into a common manifold 58 which is connected to another manifold 54 by a flue or duct 59, located in wall 1, said manifold being provided with a multiplicity of flues or ducts 55 connecting with the interior of the furnace or combustion chamber 12, under arch 5.

The third circulation is similar to the second aforesaid only in the opposite wall 2 wherein the air from the blower 17 enters the wind box 20, the elbow 21 with the damper 32 under the stoker grate 16 of the stoker 14 and part of which is forced by pressure into the duct or flue 60 and 57, passes into the common manifold 62, from whence it passes into the manifold 52 through the flues or ducts 53 into the combustion chamber 12 of the furnace directly under the combustion arch 5.

The walls are provided with special expansion blocks 25 and 26 hereinbefore mentioned and described and the vertical expansion means 29.

The fourth circulation is a natural or stack draft wherein the air passes into the flues or ducts 39 formed upon the completion of the arch 5 through ducts, or flues or openings provided with controlling dampers 47 with slides 46, flows at right angles across and throughout the arch or in a direction at right angles to the flow of flaming gases in the combustion chamber 12, into a common manifold 40, passes through a flue or duct 41 into a common manifold 35 from whence it enters the throat 13 of the furnace through a multiplicity of flues or ducts 37.

This arch is composed of a series of blocks 38 hereinbefore described and illustrated in Figures 1, 2, 7 and 8.

Having thus described and illustrated the preferred embodiment of our invention we do not desire to limit ourselves to the exact subject matter pertaining to the specific construction and circulations in combination as modifications may be made without departing from the spirit of the invention or scope of the claims.

We claim:—

1. In a furnace construction having channelled refractory walls around the combustion chamber, a stoker grate, an air feeder therebelow, and an outlet in an upper part of the chamber for the products of combustion; the combination of an arch having air passages therein, air inlets to said passages, means adjacent the furnace outlet whereby air may be drawn thereinto through the inlets and passages under the influence of the furnace draft, air conducting means communicating with the wall channels and with the space beneath the grate whereby part of the air from the feeder is forced into and through said channels, and air delivery means communicating with said channels into an upper part of the furnace.

2. In a furnace construction having channelled refractory walls around the combustion chamber, a stoker grate, an air feeder therebelow, and an outlet in an upper part of the chamber for the products of combustion; the combination of an arch having air passages therein, air inlets to said passages, means adjacent the furnace outlet whereby air may be drawn thereinto through the inlets and passages under the influence of the furnace draft, air conducting means communicating with the wall channels and with the space beneath the grate whereby part of the air from the feeder is forced into and through said channels, and air delivery means communicating with said channels into an upper part of the furnace, together with valve means controlling the air circulated through said walls and said arch.

3. In a furnace construction having channelled refractory walls around the combustion chamber, a stoker grate, an air feeder therebelow, and an outlet in an upper part of the chamber for the products of combustion; the combination of an arch having air passages therein, air inlets to said passages, means adjacent the furnace outlet whereby air may be drawn thereinto through the inlets and passages under the influence of the furnace draft, air conducting means communicating with the wall channels and with the space beneath the grate whereby part of the air from the feeder is forced into and through said channels, and air delivery means communicating with said channels into an upper part of the furnace, together with valve means independently controlling the air induced by the draft through the arch and the air forced by the feeder through the walls.

Signed at Long Island City, in the county of Queens and State of New York this 14th day of October, A. D. 1925.

FRANK H. WAITE.
GEORGE W. DAVEY.